(12) United States Patent
Katagiri et al.

(10) Patent No.: US 8,252,477 B2
(45) Date of Patent: Aug. 28, 2012

(54) DIRECT-FLAME FUEL CELL

(75) Inventors: Fumimasa Katagiri, Nagano (JP); Shigeaki Suganuma, Nagano (JP); Jun Yoshiike, Nagano (JP); Yasue Tokutake, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 391 days.

(21) Appl. No.: 11/948,379

(22) Filed: Nov. 30, 2007

(65) Prior Publication Data

US 2008/0131748 A1 Jun. 5, 2008

(30) Foreign Application Priority Data

Dec. 1, 2006 (JP) .................................. 2006-325624

(51) Int. Cl.
*H01M 4/86* (2006.01)
*H01M 8/12* (2006.01)
*H01M 8/22* (2006.01)

(52) U.S. Cl. .................... 429/486; 429/496; 429/502

(58) Field of Classification Search .............. 429/12–46, 429/489, 486, 496, 502; 44/457; 501/1–155
See application file for complete search history.

(56) References Cited

U.S. PATENT DOCUMENTS

| | | | | |
|---|---|---|---|---|
| 4,802,958 A * | 2/1989 | Mazanec et al. | .............. | 205/338 |
| 7,244,525 B2 | 7/2007 | Horiuchi et al. | | |
| 7,740,968 B2 | 6/2010 | Yamashita et al. | | |
| 2003/0134176 A1 * | 7/2003 | Sarkar | .............. | 429/40 |
| 2004/0018409 A1 * | 1/2004 | Hui et al. | .............. | 429/33 |
| 2004/0086761 A1 * | 5/2004 | Horiuchi et al. | .............. | 429/30 |
| 2004/0202910 A1 | 10/2004 | Horiuchi et al. | | |
| 2005/0048352 A1 | 3/2005 | Horiuchi et al. | | |
| 2006/0134486 A1 * | 6/2006 | Horiuchi et al. | .............. | 429/26 |
| 2006/0204829 A1 * | 9/2006 | Ovshinsky et al. | .............. | 429/40 |
| 2006/0257718 A1 | 11/2006 | Sato et al. | | |

FOREIGN PATENT DOCUMENTS

| | | |
|---|---|---|
| JP | 09-073913 | 3/1997 |
| JP | 2004-139936 | 5/2004 |
| JP | 2004-311249 | 11/2004 |
| JP | 2004-319240 | 11/2004 |
| JP | 2006-202737 | 8/2006 |

OTHER PUBLICATIONS

"Calcium doped ceria-based materials for cost-effective intermediate temperature solid oxide fuel cells", Zhu, B. et al., Solid State Sciences, vol. 5, 2004, pp. 1127-1134.*

"Innovative solid carbonate-ceria composite electrolyte fuel cells", Zhu, B. et al. Electrochemistry Communications, vol. 3, 2001, 566-571.*

"Electrochemical Power Generation Directly from Combustion Flame of Gases, Liquids, and Solids", Horiuchi M. et al., Journal of the Electrochemical Society, vol. 151, No. 9, 2004, pp. A1402-A1405, XP002470640.

* cited by examiner

*Primary Examiner* — Jonathan Crepeau
*Assistant Examiner* — Kenneth Douyette
(74) *Attorney, Agent, or Firm* — Rankin, Hill & Clark LLP

(57) ABSTRACT

A direct-flame fuel cell according to the invention has a cell in which a solid electrolyte 1 is sandwiched between an anode 2 and a cathode 3. The anode 2 contains one or more kinds of alkaline metal compounds or alkaline earth metal compounds which are effective in suppressing soot generation due to exposure to a flame. Where the anode 2 includes two or more layers 2a and 2b, the one or more kinds of alkaline metal compounds or alkaline earth metal compounds are contained in the outermost layer 2b.

5 Claims, 6 Drawing Sheets

DIRECT-FLAME FUEL CELL

BACKGROUND OF THE INVENTION

The present invention relates to a direct-flame fuel cell which uses a cell that is configured in such a manner that a solid electrolyte is sandwiched between an anode and a cathode.

Among various types of fuel cells is a direct-flame fuel cell in which power is generated by placing a cell inside or in the vicinity of a flame and thereby exposing the anode side to the flame, the cell being configured in such a manner that a solid electrolyte is sandwiched between an anode and a cathode. This type of direct-flame fuel cell is disclosed in JP-A-2004-139936.

Since the anode is directly exposed to a flame, the direct-flame fuel cell can generate power in a simple and easy way and enables miniaturization of a fuel cell module in which cells are combined as desired. Furthermore, with a high degree of freedom of fuel selection, it is expected that the direct-flame fuel cell will be applied to various uses.

In the direct-flame fuel cell, since the surface of the anode of the cell is directly exposed to a flame during power generation, a large amount of soot is attached to the anode depending on the time of exposure to the flame. The soot that is attached to the anode is a cause of deteriorating the power generation performance of the cell to a large extent over time.

SUMMARY OF THE INVENTION

An object of the present invention is to provide a direct-flame fuel cell which suppresses deterioration of the power generation performance of a cell by lowering the degree of attachment of soot to the anode.

According to the present invention, there is provided with a direct-flame fuel cell including:

a cell in which a solid electrolyte is sandwiched between an anode and a cathode, wherein the anode contains one or more kinds of alkaline metal compounds or alkaline earth metal compounds.

According to the invention, the attachment of soot to the anode is suppressed by the function of the one or more kinds of alkaline metal compounds or alkaline earth metal compounds, whereby the deterioration of the power generation performance of the cell can be suppressed. The invention can thus provide a direct-flame fuel cell having a long life.

DETAILED DESCRIPTION OF THE PREFERRED EMBODIMENTS

Figure 1:
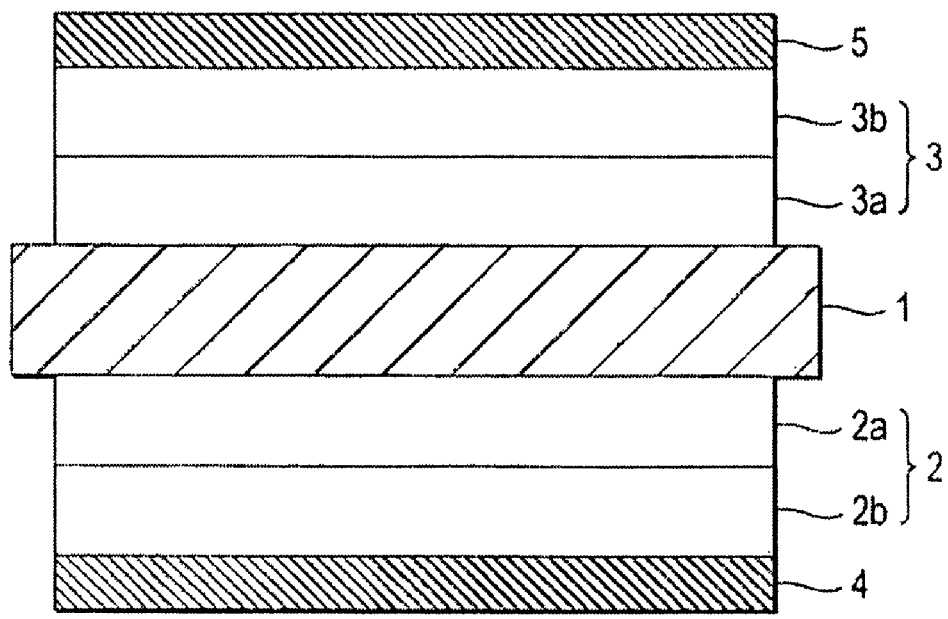
FIG. 1 is a schematic diagram showing an exemplary direct-flame fuel cell according to the present invention.

In a process of developing a technique for suppressing generation of soot that is attached to the anode of a direct-flame fuel cell, the present inventors have found that $Rh_2O_3$ which is added as an oxidation catalyst exhibits an effect of suppressing soot generation. Specifically, a cell is prepared in which, as shown in FIG. 1, an anode 2 having a two-layer structure (formed by an inner anode layer 2a made of samaria-doped ceria (SDC) (60 wt %)-$Ni_{0.9}Co_{0.1}O$ and an outer anode layer 2b which is made of SDC (30 wt %)-$Ni_{0.9}Co_{0.1}O$ added with $Rh_2O_3$ (5 wt %)) is provided on one side of a solid electrolyte 1 made of samaria-doped ceria (SDC) and a cathode 3 having a two-layer structure (formed by an inner cathode layer 3a made of SDC (50 wt %)-samarium strontium cobaltite (SSC) and an outer cathode layer 3b made of a cathode material of SDC (30 wt %)-SSC added with a pore-forming material (55 vol %)) is provided on the other side of the solid electrolyte 1. To transfer generated power to the outside, collectors 4 and 5 each of which is a platinum mesh are connected to the outer anode layer 2b and the outer cathode layer 3b, respectively of the cell of FIG. 1. For comparison, a comparative cell is prepared which had the same two-layer anode and cathode as the cell of FIG. 1 except that the outer anode layer does not contain $Rh_2O_3$. Each of the above cells is caused to generate power at a constant current (400 mA/cm$^2$) while being exposed to a flame of a Bunsen burner to which a fuel-air mixture gas containing n-butane (6.5%), and a variation of the output power with time is observed.

Figure 2:
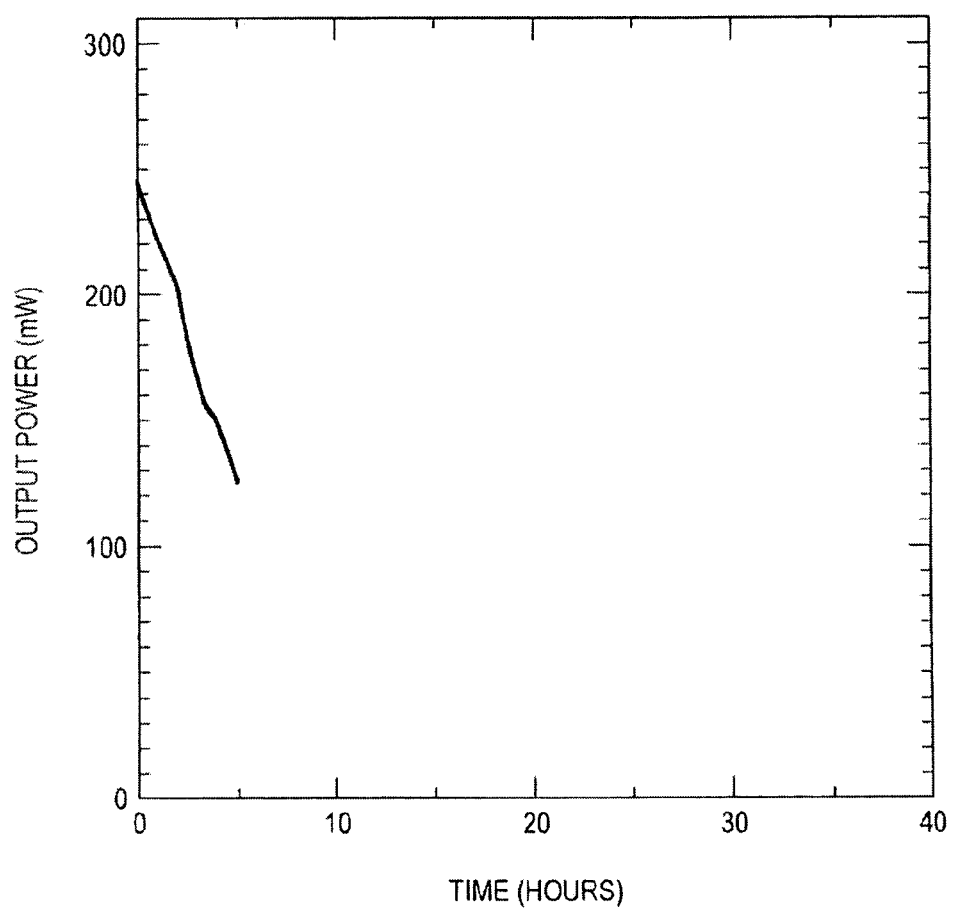
FIG. 2 is a graph showing output power reduction of a fuel cell using a cell having an anode in which no component that is effective in suppressing soot generation is added.
Figure 3:
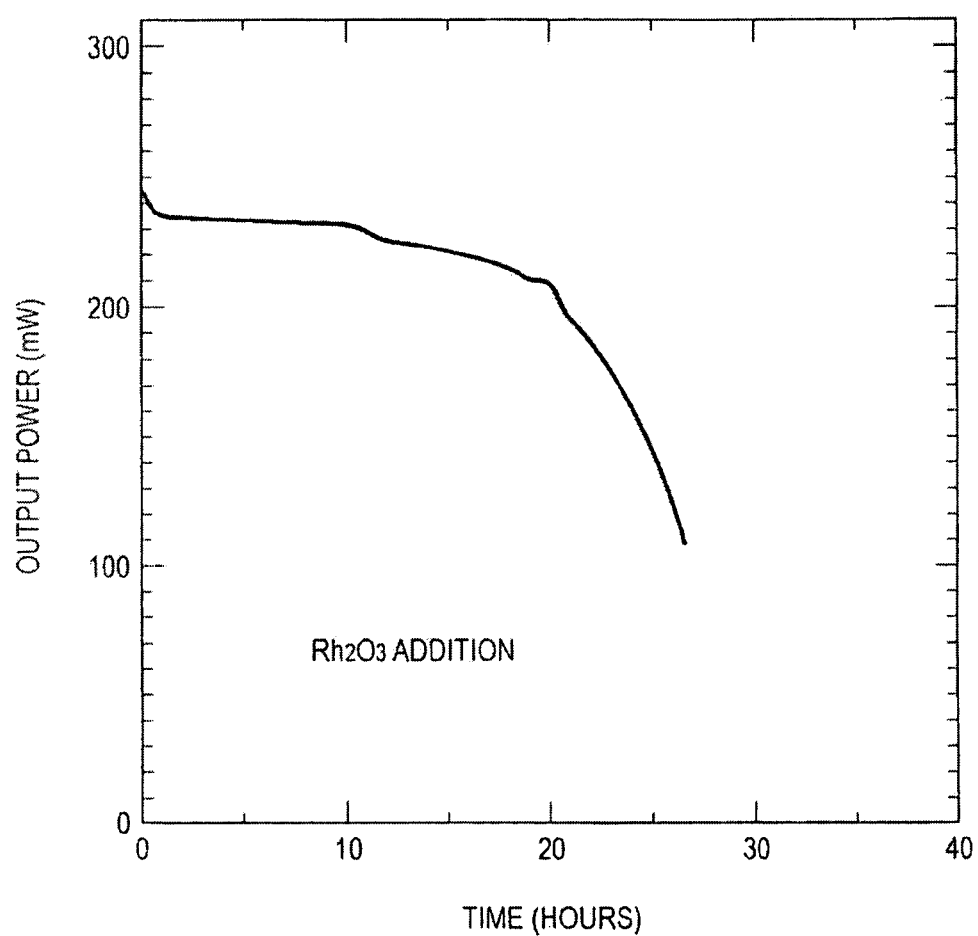
FIG. 3 is a graph showing output power reduction of a fuel cell using a cell having an anode in which $Rh_2O_3$ is added at 5 wt %.

FIGS. 2 and 3 show results of the comparative cell and the cell using the outer anode layer 2b that is added with $Rh_2O_3$, respectively. In the comparative cell, soot is generated remarkably immediately after the start of power generation and the output power decreased steeply. In the cell using the outer anode layer 2b that is added with $Rh_2O_3$, output power reduction due to soot generation is observed after a lapse of about 20 hours. However, even in this case, it is difficult to suppress soot generation in the long-term power generation experiment.

The inventors have found that compounds of alkaline earth metals such as calcium, barium, and strontium and compounds of alkaline metals such as sodium, potassium, and cesium are effective in suppressing soot generation by studying the soot generation suppressing effect (like the one Rh2O3 exhibits) of various substances, and have completed the invention on the basis of this fact.

Typical examples of such alkaline earth metal compounds are carbonates, oxides, hydroxides, nitrates, and sulfates of calcium, barium, and strontium. Typical examples of such alkaline metal compounds are carbonates, oxides, hydroxides, nitrates, and sulfates of sodium, potassium, and cesium. A mixture of alkaline metal compounds, a mixture of alkaline earth metal compounds, or a mixture of an alkaline metal compound and an alkaline earth metal compound may also be used.

Figure 4:
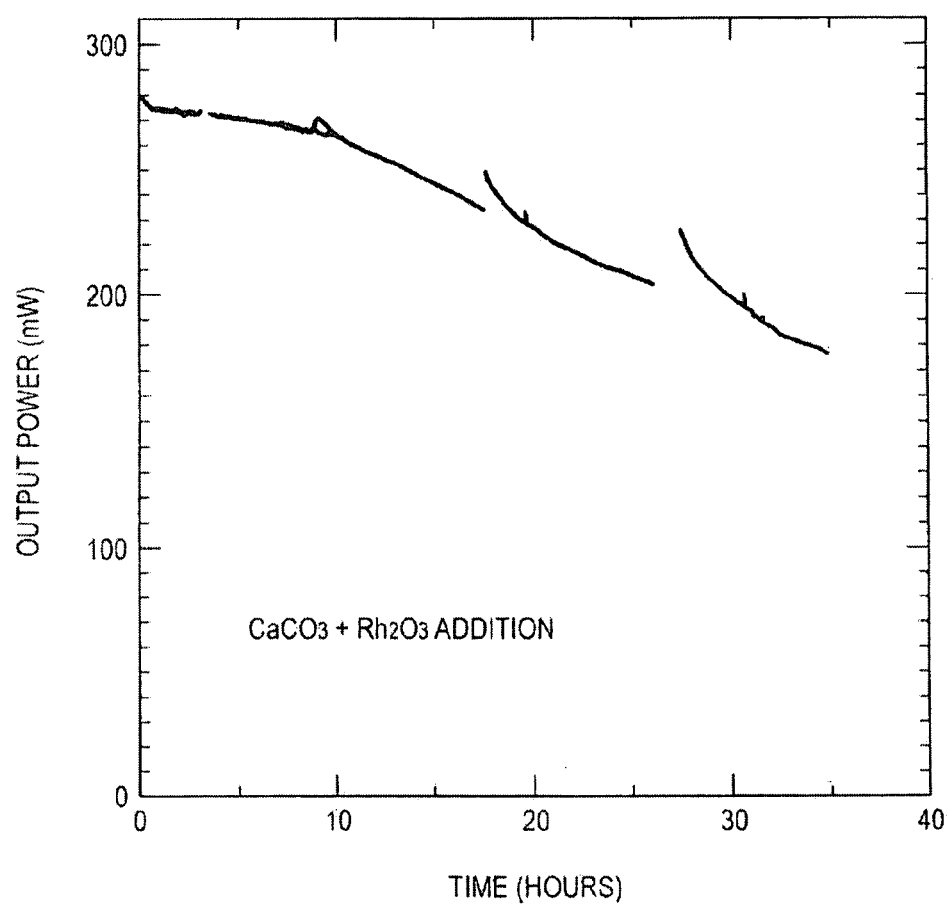
FIG. 4 is a graph showing output power reduction of a fuel cell using a cell having an anode in which $CaCO_3$ and $Rh_2O_3$ are added at 3 wt % and 5 wt %, respectively.

For example, it has been found that if $CaCO_3$ is added at 3 wt % in the outer anode layer 2b (containing $Rh_2O_3$ at 5 wt %) of the above-described cell, soot generation can be suppressed satisfactorily and output power reduction is delayed as shown in FIG. 4.

Figure 5A:
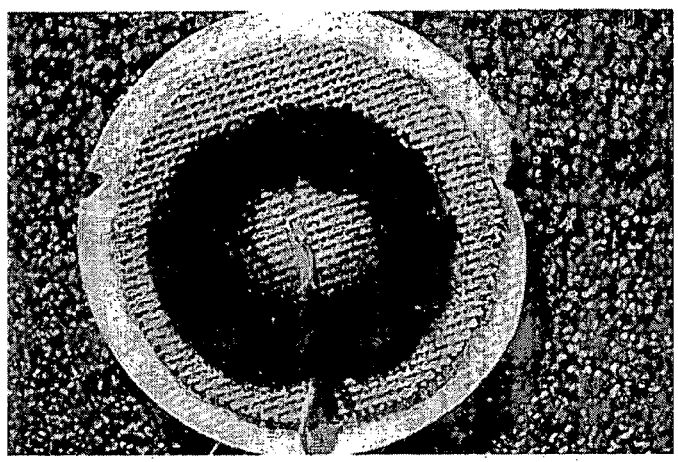
FIGS. 5A to 5C are photographs, taken after power generation of 15 hours, of the anode surfaces of a sample using an outer anode layer in which neither $Rh_2O_3$ nor $CaCO_3$ is added, a sample using an outer anode layer in which only $Rh_2O_3$ is added, and a sample using an outer anode layer in which both of $Rh_2O_3$ and $CaCO_3$ are added.
Figure 5B:
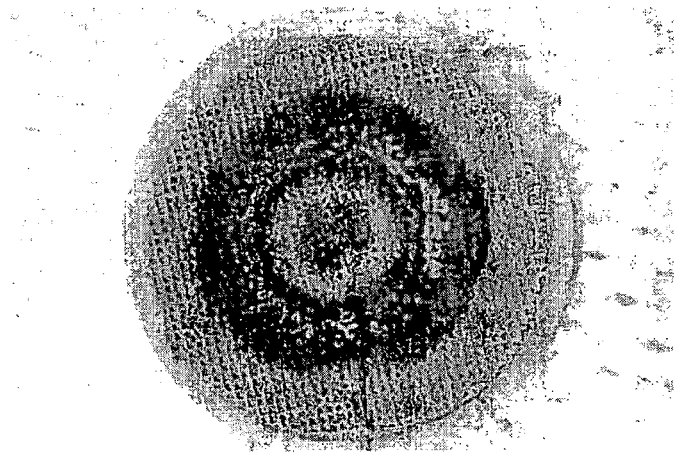
Figure 5C:
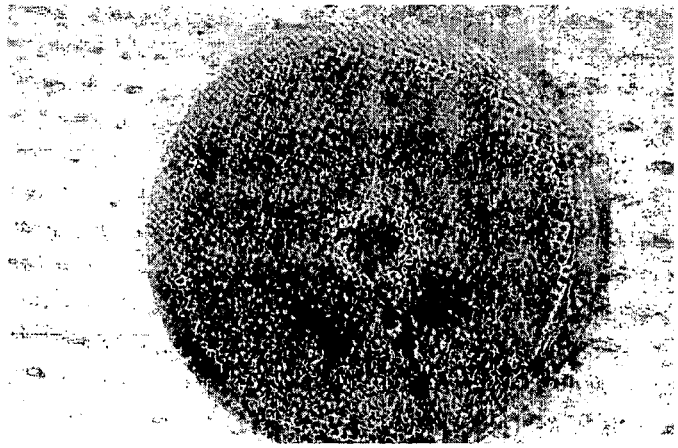

FIGS. 5A to 5C are photographs, taken after power Generation of 15 hours, of the anode surfaces of sample 1 using an outer anode layer in which neither $Rh_2O_3$ nor $CaCO_3$ is added, sample 2 using an outer anode layer in which only $Rh_2O_3$ is added, and sample 3 using an outer anode layer in which both of $Rh_2O_3$ and $CaCO_3$ are added. It is seen that soot is attached to the entire surface of the anode in sample 1 (FIG. 5A; neither $Rh_2O_3$ nor $CaCO_3$ is added) and the degree of attachment of soot is lower in sample 2 (FIG. 5B; only $Rh_2O_3$ is added) than in sample 1. Almost no soot is attached to the anode in sample 3 (FIG. 5C; both of $Rh_2O_3$ and $CaCO_3$ are added). The same test is performed on a sample in which only $CaCO_3$ is added to produce a result that is the same as of sample 3.

The anode of the fuel cell according to the invention is not limited to the above-described one having a two-layer structure, and may have a multilayer structure of three or more layers or a single-layer structure (described below). In each case, it is important that the alkaline metal compound or the alkaline earth metal compound (essentially a non-conductive substance) which is effective in suppressing soot generation cue to exposure to a flame be added in the outermost layer of the cell that is directly exposed to a flame.

In practice, it is preferable that $CaCO_3$ be added at 1 to 10 wt % with respect to the amount of the anode materials irrespective of whether the anode contains $Rh_2O_3$. If the addition amount of $CaCO_3$ is smaller than 1 wt %, the effect of suppressing soot generation is slight. If it is larger than 10 wt %, output power reduction starts earlier contrary to the intention. In the case of a multi-layered anode, the amount of the compound such as $CaCO_3$ that is effective in suppressing soot generation is that in the outermost anode layer which is directly exposed to a flame.

In the cell of the direct-flame fuel cell according to the invention, each of the solid electrolyte, the anode, and the cathode can be produced by a general method by using materials of a member of cells of ordinary solid electrolyte fuel cells except that the alkaline metal compound or the alkaline earth metal compound is added in the anode which is directly exposed to a flame at a sufficient amount to suppress soot generation.

The material of the solid electrolyte may be one of the following materials (a), (b), and (c):

(a) Ceria-based ceramics such as SDC (samaria-doped ceria) or GDC (gadolia-doped ceria).

(b) Zirconia-based ceramics such as YSZ (yttria-stabilized zirconia), ScSZ (scandia-stabilized zirconia), or YSZ or ScSZ doped with Ce, Al, or the like.

(c) LSGM (lanthangallate) or bismuth-oxide-based ceramics.

The material of the anode may be one of the following materials (a), (b), (c), and (d):

(a) A cermet of nickel, cobalt, and yttria-stabilized-zirconia-based ceramics, scandia-stabilized-zirconia-based ceramics, or ceria-based ceramics (SDC, GDC, or YDC).

(b) A cermet of nickel and yttria-stabilized-zirconia-based ceramics, scandia-stabilized-zirconia-based ceramics, or ceria-based ceramics (SDC, GDC, YDC, or the like).

(c) A sintered body having a conductive oxide as the main component (50 to 99 wt %). For example, the conductive oxide may be a solid solution of nickel oxide and lithium.

(d) A material obtained by adding a platinum-group metal or its oxide to one of the materials (a)-(d) at 1 to 10 wt %.

In the invention, a preferable anode electrode material is one containing a cermet of nickel oxide and cobalt oxide.

The material of the cathode may be a strontium (Sr)-added cobalate compound of a rare earth element such as lanthanum or samarium (e.g., samarium strontium cobaltite or lanthanum strontium cobaltite), a strontium-added manga-nate compound of lanthanum (e.g., lanthanum strontium manganite), a strontium-added gallate compound of lanthanum, or a strontium-added ferrite compound (e.g., lanthanum strontium cobalt ferrite). If necessary, a carbon-based pore-forming material or the like may be added in the cathode.

Each of the anode and the cathode may have either a single-layer structure or a multilayer structure. In the case of the multilayer structure, it is appropriate that the compound that contributes to suppression of soot generation, which is an important element of the invention, be added in the outermost portion (layer) of the anode that is directly exposed to a flame. In the case of the multilayer structure, the number of layers of the anode or cathode may be two or more.

The direct-flame fuel cell according to the invention is useful as a single-cell fuel cell which generates power in an atmosphere that is a mixture of a fuel component and an oxidizing agent component, and is particularly useful as an open-to-air fuel cell which generates power in a state that the cell is exposed to a flame in an open-to-air atmosphere rather than in a state that the cell is placed in a closed space.

EXAMPLES

Although Examples of the invention will be described below, the invention is not limited to them.

Example 1

A cell is produced according to the following procedure.

An SDC (samaria-doped ceria, $Sm_{0.2}Ge_{0.8}O_{1.9}$) ceramic substrate to be used as a solid electrolyte is prepared. This SDC ceramic substrate which is a circular plate of 180 (μm in thickness and 15 mm in diameter is produced in the following manner. A green sheet is shaped by a doctor blade method. Fibrous cloths are applied to both surfaces of the green sheet and the green sheet is pressed at about 15 MPa (150 kg/cm$^2$) by hydraulic pressing, whereby the surfaces of the green sheet is roughened. The thus-processed green sheet is punched into a circular plate and then fired at 1,300° C.

$N_{0.9}Co_{0.1}O_x$ paste added with SDC at 60 wt % is printed on one surface (area: 1.8 cm$^2$) of the ceramic substrate in an area of 1.3 cm$^2$ as an inner anode layer, and $Ni_{0.9}Co_{0.1}O_x$ paste added with $CaCO_3$, $Rh_2O_3$ and SDC at 3 wt %, 5 wt % and 30 wt %, respectively, is printed thereon in an area of 1.3 cm$^2$ as an outer anode layer. SSC (samarium strontium cobaltite, $Sm_{0.5}Sr_{0.5}CoO_3$) paste added with SDC at 50 wt % is printed on the other surface in an area of 1.3 cm$^2$ as an inner cathode layer, and SSC paste added with SDC and a carbon powder (pore-forming material) at 30 wt % and 55 vol %, respectively, is printed thereon as an outer cathode layer.

Then, an assembly in which platinum meshes formed by welding platinum wires are buried in the printed pastes of the cuter anode layer and the outer cathode layer is fired in the air at 1,200° C. for one hour, whereby a cell of a solid oxide fuel cell (i.e., a cell whose anode and cathode had a two-layer structure as shown in FIG. 1) is produced.

For comparison, a cell of a solid oxide fuel cell is produced according to the same procedure except that a paste that is not added with $CaCO_3$ is used for forming an outer anode layer.

The generation of soot on the anode surface is evaluated by exposing the cell to the flame of a Bunsen burner to which a fuel-air mixture gas containing n-butane (6.5%) is supplied at a total flow rate of 400 sccm. Power is generated for a long time with such a load that a constant current (400 mA/cm$^2$) flows and the generation of soot on the anode surface is checked in a state that the anode of the cell is exposed to the flame. FIGS. 5B and 5C, which are referred to above, are photographs of the anode surfaces of the cells taken after power generation of 15 hours. It is clearly seen that the amount of generated soot is smaller in the anode that is added with $CaCO_3$ (FIG. 5C) than in the anode that is not added with $CaCO_3$ (FIG. 5B). The durability of the cell whose anode is added with $CaCO_3$ is improved accordingly.

Example 2

Figure 6:
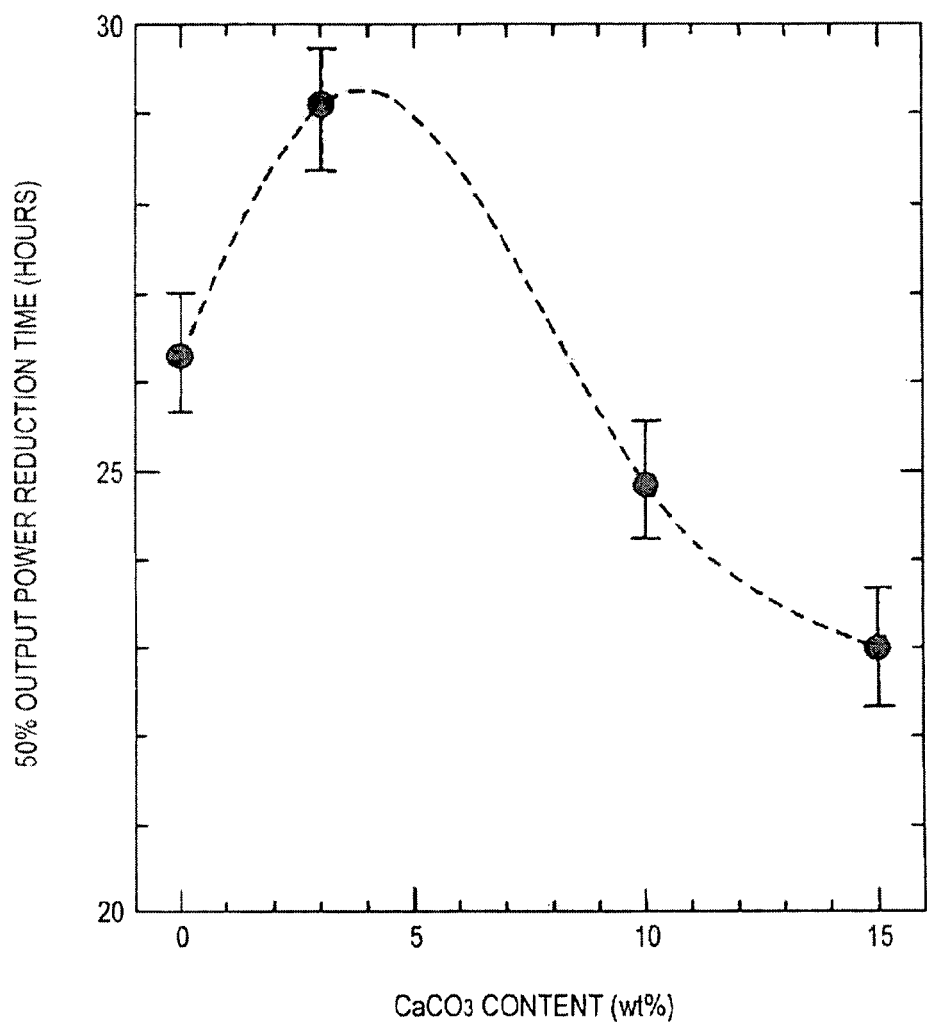
FIG. 6 is a graph showing a relationship between the amount of $CaCO_3$ added in the outer anode layer and the time taken until the output power of the fuel cell decreases to 50% of an initial value.

Experiments are conducted in the same manner as in Example 1 while the amount of $CaCO_3$ added to the paste for the outer anode layer is varied, and the time taken until the output power of the fuel cell decreased to 50% of an initial value is measured. FIG. 6 shows results. It is seen from the results that the practical amount of $CaCO_3$ added in the outer anode layer is about 1 to 10 wt %, preferably, 2 to 7 wt %.

As is understood from the above, the practical amount of a calcium compound that is added in the anode can be determined easily on the basis of the kinds of anode material and calcium compound used, flame conditions, etc. by conducting simple experiments. Likewise, the amount of a compound added other than calcium compounds that is effective in suppressing soot generation can be determined easily on the basis of the kinds of anode material and compound used, flame conditions, etc. by conducting simple experiments.

What is claimed is:

1. A direct-flame fuel cell comprising:
   a cell in which a solid electrolyte is sandwiched between an anode and a cathode, wherein:
   the cell is adapted to generate power when the anode is exposed to a flame,
   the anode comprises a material selected from the group consisting of:
   (a) a cermet of nickel, cobalt and
      (i) yttria-stablized-zirconia-based ceramics,
      (ii) scandia-stabilized-zirconia-based ceramics, or
      (iii) ceria-based ceramics; and
   (b) a cermet of nickel and
      (i) yttria-stablized-zirconia-based ceramics,
      (ii) scandia-stabilized-zirconia-based ceramics, or
      (iii) ceria-based ceramics; and
   the anode further comprises calcium carbonate in addition to the material.

2. The direct-flame fuel cell according to claim 1, wherein the content of the calcium carbonate is 1 to 10 wt %.

3. The direct-flame fuel cell according to claim 1, wherein the anode comprises a multilayer structure, and an outermost layer of the anode comprises calcium carbonate.

4. The direct-flame fuel cell according to claim 1, wherein the direct-flame fuel cell is a single-cell fuel cell adapted to generate power in an atmosphere that is a mixture of a fuel component and an oxidizing agent component.

5. The direct-flame fuel cell according to claim 1, wherein the direct-flame fuel cell is an open-to-air fuel cell adapted to generate power when the cell is exposed to a flame in an open-to-air atmosphere.

* * * * *